April 17, 1945.  H. F. TAYLOR ET AL  2,373,721
APPARATUS FOR COATING
Filed Aug. 8, 1942  3 Sheets-Sheet 1

INVENTORS
HARDEN F. TAYLOR AND
VLADIMIR A. NEDZVEDSKY
BY
Wm. S. Pritchard
ATTORNEY

INVENTORS.
HARDEN F. TAYLOR AND
VLADIMIR A. NEDZVEDSKY
BY
ATTORNEY.

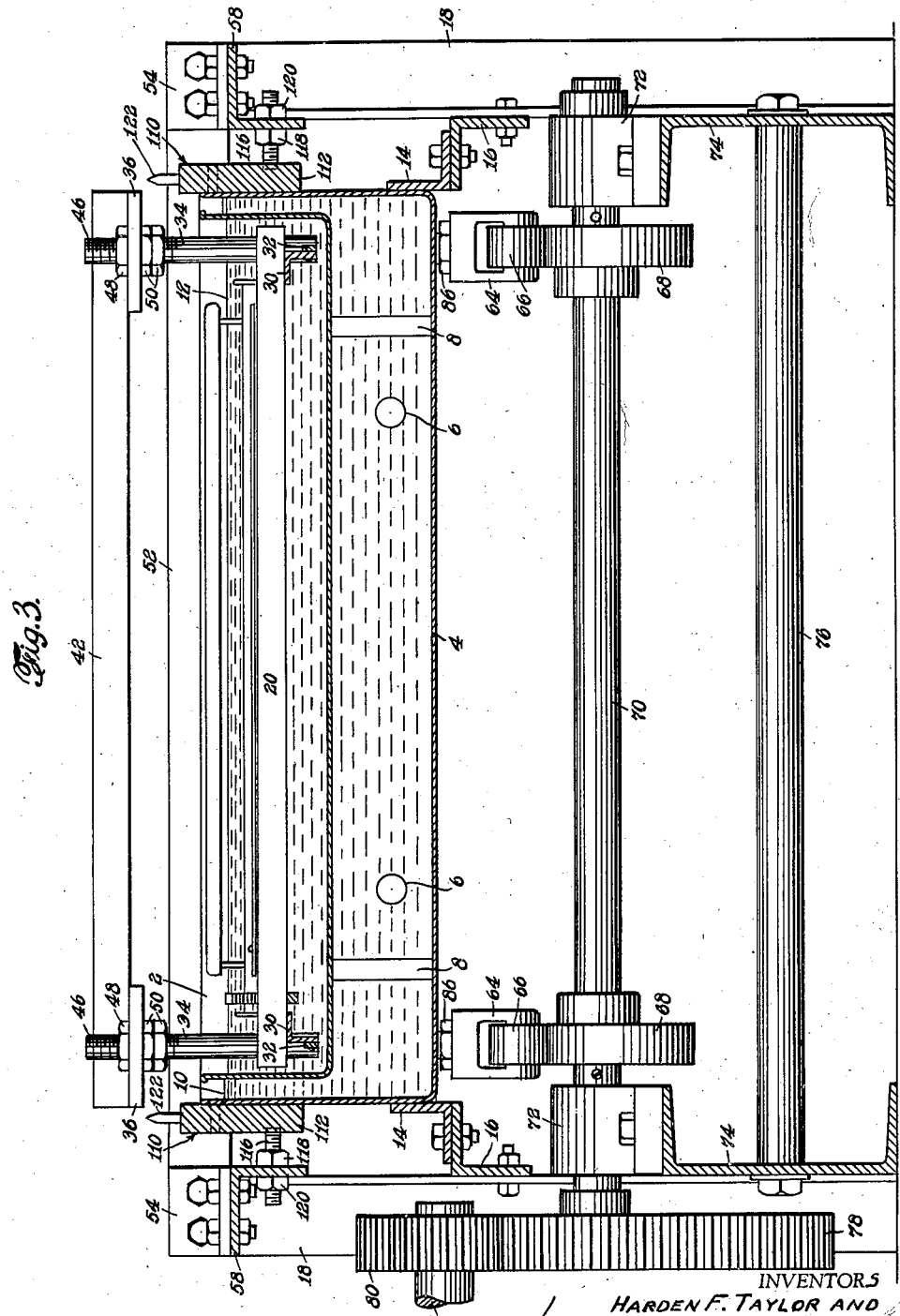

Patented Apr. 17, 1945

2,373,721

UNITED STATES PATENT OFFICE 2,373,721

APPARATUS FOR COATING

Harden F. Taylor and Vladimir A. Nedzvedsky, New York, N. Y., assignors to The Atlantic Coast Fisheries Company, New York, N. Y., a corporation of Maine Application August 8, 1942, Serial No. 454,104

13 Claims. (Cl. 91—4)

This invention relates to coating small objects. More particularly, this invention relates to an apparatus for applying coating to small objects, such as pills, tablets, confections and the like, wherein the coating medium at the time of application is a viscous liquid. Specifically, this invention relates to the application of a coating of gelatin to individual unit vitamin preparations, the gelatin being in the form of a solution at the time of application and of such a concentration that upon cooling it will set to a firm gel which after drying constitutes a hard, tough, protecting coat.

An object of this invention is to provide an apparatus for applying a uniform coat in multiple to a predetermined portion of the surfaces of the small articles to be coated.

Another object of the invention is to provide an apparatus including means for controlling accurately the depth to which the objects to be coated are dipped into the coating medium.

Other and additional objects will appear from the following description, appended claims, and accompanying drawings illustrating an embodiment of the instant invention and forming a part of this specification, and wherein:

Figure 3 is a section taken on the line 3—3 of Figure 1; and

Figure 1:
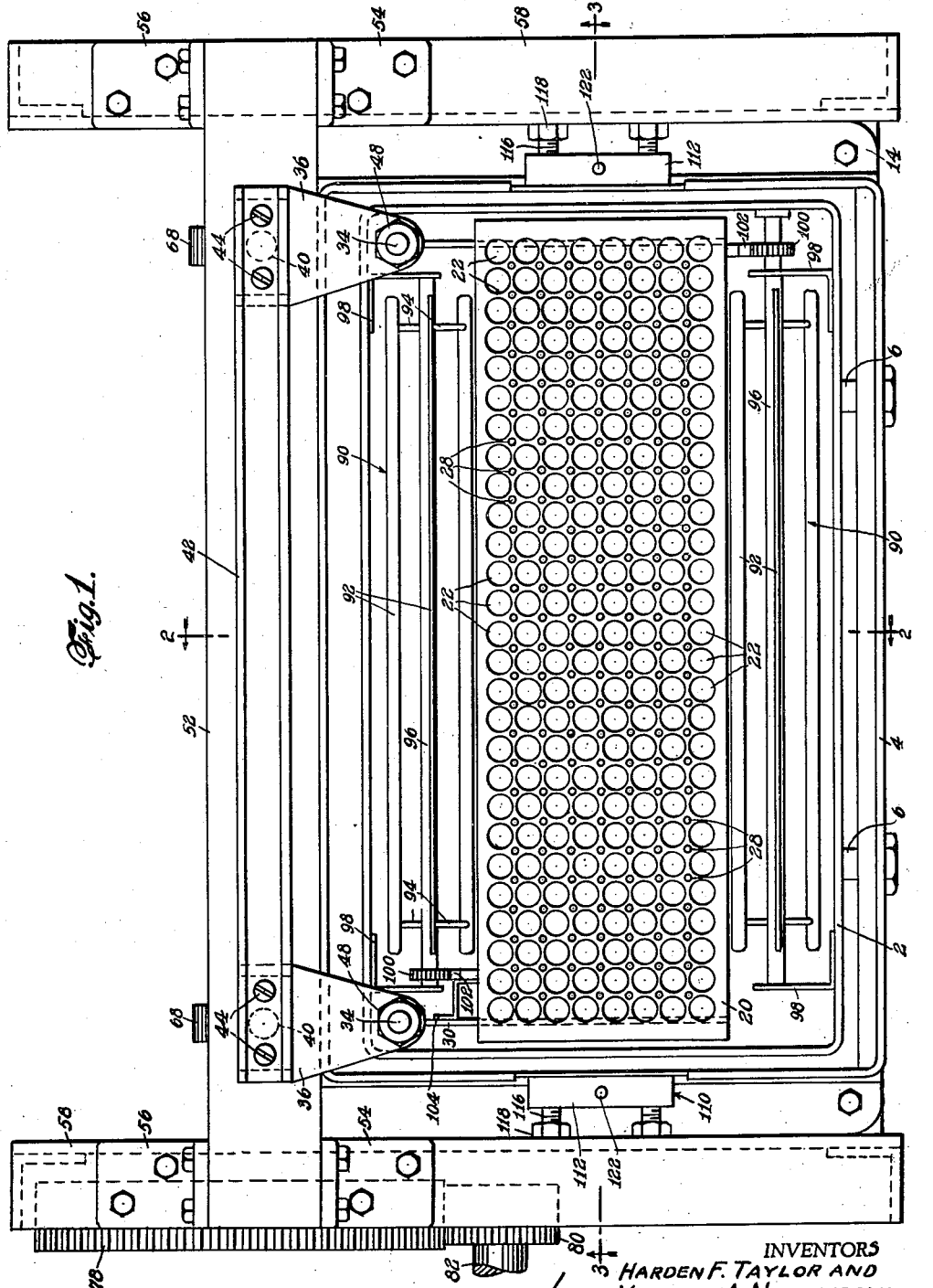
Figure 1 is a top plan view.

In accordance with the principles of this invention, a plurality of small objects (i. e., pills, tablets, confections etc.), preferably arranged in a predetermined geometric order (positional relationship) are simultaneously and individually seized at the respective tops thereof with a holder, the objects on said holder being disposed in a geometric order corresponding to the geometric order thereof prior to seizure. The holder, carrying the plurality of small objects, is positioned over a tank containing the coating composition so that the objects are above and in spaced relationship to said coating composition. Means are provided to elevate a predetermined quantity of the coating composition until the objects on the holder are immersed to a predetermined depth in said composition.

In the one form of the invention, there is provided a reciprocating member which is alternately immersed in the coating composition and emersed therefrom. The member is so designed and constructed that upon emersion it carries a predetermined thickness of the coating medium. After emersion, the member carrying the coating composition is elevated so that the small objects will be simultaneously immersed therein to a predetermined and fixed depth.

In the preferred embodiment of the invention, the reciprocating member is provided with a plurality of individual means, such as cups, depressions, pockets, etc., hereinafter called cups, of a predetermined size and volume and which upon emersion from the coating bath will retain a predetermined quantity of the coating medium. The cross-sections of the cups are usually similar to though somewhat larger (to permit clearance) than the horizontal cross-sections of the objects to be coated. The depth of the cups depends on the height of the objects to be coated and particularly the height to which said cups are elevated during the coating operation. Usually the depth of the cups is greater than one-half the thickness of the objects to be coated. The cups are preferably arranged in a geometric order corresponding to the geometric order of the articles on the holder so that when the reciprocating member is elevated to the desired height, each object on the holder will be simultaneously immersed to the desired predetermined depth in the cup in alignment therewith.

When the cups consist of depressions formed in a plate, the latter is also provided with means to permit the excess composition (either occurring from the immersion step or from displacement in the dipping operation) to quickly and effectively drain therefrom.

The means actuating the reciprocating member are preferably adjustable and are designed to alternately immerse the reciprocating member in the coating composition to a predetermined depth (i. e., below the level of the composition) and emerse the same therefrom, and, continuously with the emersion, elevate the reciprocating member to a predetermined height, the height being such as to obtain immersion of the objects on the holder to the desired depth.

In order to maintain the coating composition homogeneous and uniform (and free of skin on the top thereof) agitators are provided. In the preferred form, the agitators are actuated by the movement of the reciprocating means.

In the preferred form of the invention, the objects to be coated are individual units (tablets) of a vitamin preparation comprising a gelable, preferably gelatin, matrix containing discrete particles of a vitamin-bearing oil dispersed therein, and the coating is obtained from an aqueous gelatin solution in which the gelatin is of such a concentration that, at an elevated temperature, the composition is liquid and upon cooling will set to a firm jelly.

Referring now to the drawings wherein an illustrative embodiment of the invention is shown and wherein like reference numerals designate like parts, the reference numeral 2 designates a receptacle, such as a tank, containing the coating medium. Since, in the preferred form, the coating medium is of a nature which is liquid at an elevated temperature and solidifies upon cooling, means are provided to maintain the coating medium at a temperature at which it is a viscous liquid. In the form shown, the tank 2 is disposed in a tank 4 in which there is provided an appropriate bath (water) maintained at the desired temperature by electric heaters 6 disposed adjacent the bottom thereof. The heaters 6 are connected to a source of electric energy (not shown) and the line may contain a thermostatic control (not shown).

The tank 2 is suspended or supported in the tank 4 in any convenient manner. In the embodiment shown, the tank 2 is seated on a plurality of pins 8 which are carried by the bottom of the tank 4. As is clear from the drawings (see Figures 2 and 3), the level 10 of the liquid in the tank 4 extends slightly above the level 12 of the coating medium in the tank 2. The tank 4, at opposite sides thereof, is secured to angles 14 in any suitable manner as, for example, by soldering. The angles 14 in turn are secured to angles 16 secured to and extending transversely between the uprights 18 of the frame.

Figure 4:
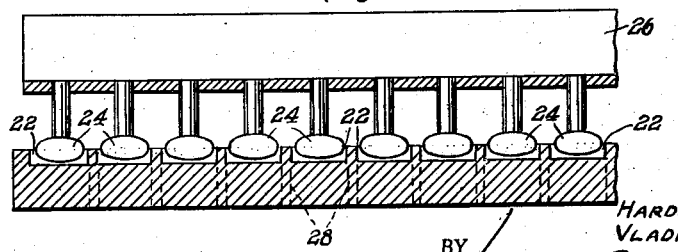
Figure 4 is an enlarged detail.

In the coating tank 2, there is provided a plate 20 provided with a plurality of depressions 22. The depressions 22, which in the form shown are circular in cross-section, are arranged in geometric order (spaced relation in horizontal and longitudinal rows, see Figure 1) corresponding to the geometric order of the objects 24 carried by a holder, generally designated by the reference numeral 26. Each depression 22 is of a size to permit the reception therein of an object 24 to be dipped therein and provide sufficient clearance for purposes which will become apparent hereafter. For reasons which will also become clear from the following description, each depression 22 is preferably made of a depth so that, when an object 24 is dipped therein, the meniscus of the coating medium therein will extend to slightly above the plane passing through the horizontal axis thereof, and there will be some clearance between the bottom of the depression and the object, as shown in Figure 4.

The plate 20 is adapted to be alternately submersed in and emersed from the coating medium. In order that each depression 22 carries a predetermined quantity of the coating medium, the plate 20 is provided with a plurality of holes 28 whereby, when the plate 20 is emersed, the excess coating medium will pass through said holes and flow back into the coating bath. Also, during the dipping operation, the coating medium displaced by the objects will also pass through the holes and be fed back to the supply of the coating medium in the tank 2. The specific arrangement and disposition of the holes 28 is not important provided a sufficient number thereof is provided so that the excess and/or displaced coating medium may be taken care of. In the form shown in Figure 1, the holes 28 are arranged in rows extending longitudinally of the plate and between the rows of depressions 22.

The plate 20 is secured to a pair of spaced angles 30, one angle being positioned adjacent one end of the plate and extending transversely thereof. Each angle 30 is secured to a bar 32 which is secured to a rod 34, mounted in one end of a bracket 36. The other end of the bracket 36 is secured to the head 38 of a shaft 40. In the form shown, the bracket 36 is secured to the head 38 by means of a channel 42 and screws 44.

As previously mentioned, each bracket 36 is adjustably secured on the respective rod 34. Various means for adjustably securing the bracket 36 to the rod 34 may be employed. In the form shown, each rod 34 is threaded at its upper portion, as indicated by the reference numeral 46, and is adjustably secured to the respective bracket 36 by means of the nuts 48 and 50 engaging opposite sides of the bracket 36. Upon proper manipulation of the nuts 48 and 50, the rods 34 may be raised or lowered, and hence the plate 20 can be positioned as desired.

Each shaft 40 is slidably disposed in a channel 52 secured between angles 54 and 56 carried by a cross-piece 58, which is also in the form of an angle and secured to the uprights. Each shaft 40 is journaled in a bearing 60 secured to the channel 52.

Each shaft 40 at its lower end is provided with a fork 64 in which a cam roller 66 is mounted. Each cam roller 66 rides on an eccentric 68 mounted on a shaft 70 which is journaled in blocks 72 carried on channels 74 secured to the uprights 18 by means of a tie-rod 76. At one end thereof, the shaft 70 carries a gear 78 which cooperates with a gear 80 on a motor shaft 82, which is driven by a motor (not shown).

An expansion spring 84, spirally coiled around each shaft 40 and positioned between the bearing 60 and a collar 86, serves to urge the shaft 40 downward and thus maintain the cam roller 66 in contact with the eccentric 68.

In order to prevent any substantial formation of skin and to maintain the coating composition at a substantially uniform temperature throughout, there is provided means to agitate the coating composition. In the form shown, there are provided two agitators 90 extending longitudinally of the bath and adjacent (but spaced from) the longitudinal edges of the plate 20. Since both agitators are of the same construction and operate in the same manner, only one thereof will be described. Each agitator 90, in the form shown, comprises a plurality of strips which constitute the paddles 92. Each paddle extends longitudinally of the tank 2 and, adjacent each end thereof, is secured to the ends of a pair of radially extending arms 94, the opposite ends of each arm 94 being secured to a shaft 96 which is journaled in the legs of the oppositely disposed angle irons 98. Adjacent one end, the shaft 96 is provided with a gear 100 which cooperates with a rack 102 which is carried on one end of an S-shaped bracket 104, the other end of the bracket 104 being secured to the angle 30. Thus, as the plate 20 is reciprocated up and down, the rack 102 cooperating with the gear 100 will cause the shaft 96 to oscillate, with the result that the paddles 92 will agitate and stir the coating composition.

Any convenient and appropriate holder for securely holding the objects 24 to be coated may be used. In the form shown, the holder 26 is of the suction type and after it has securely seized the objects 24, is positioned on the apparatus so that the articles are suspended downwardly and are above and in spaced relationship to the top level of the coating medium. The apparatus hereinbefore described is provided with means to accurately position the holder 26 so that each object 24 held thereby will be in alignment with the recess 22 into which it is to be immersed.

Figure 2:
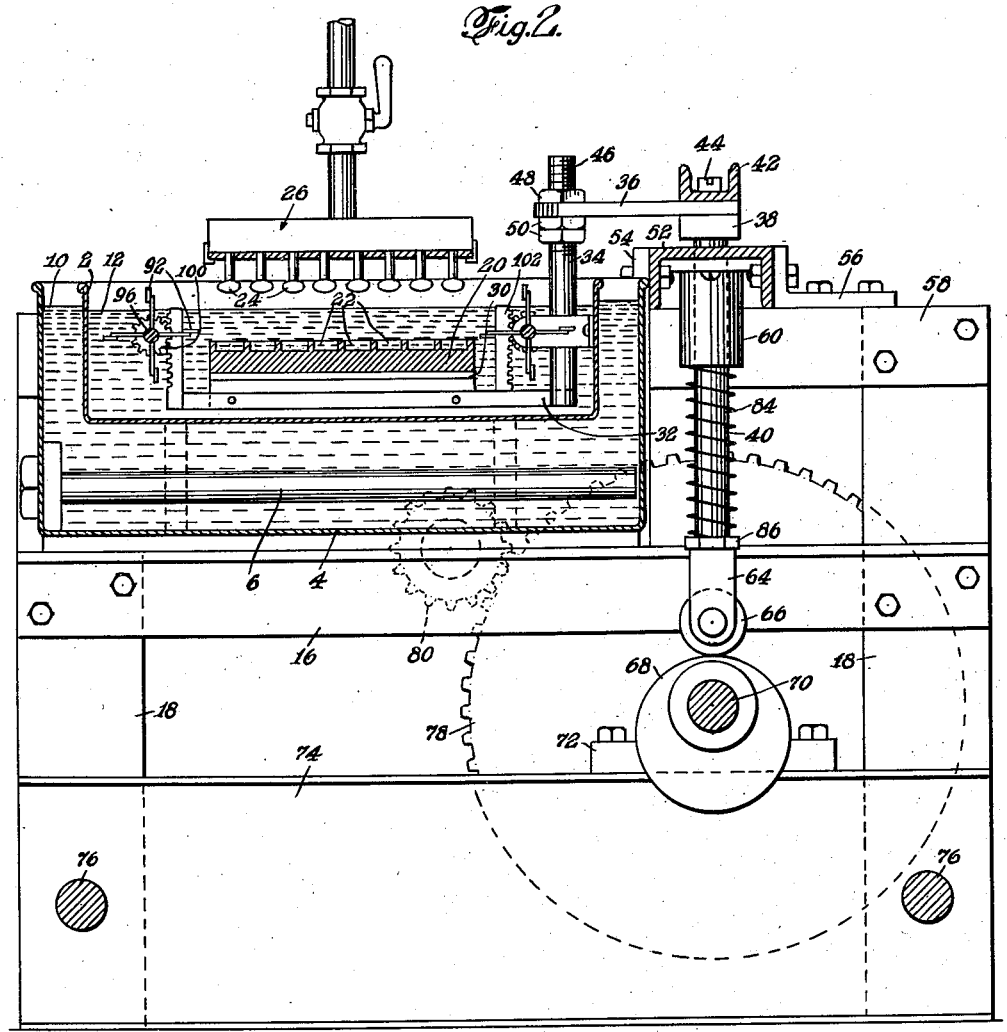
Figure 2 is a section taken on the line 2—2 of Figure 1.

As shown in Figures 1 and 2, these means, which are generally indicated by the reference numeral 110, are disposed adjacent the sides of the tank 4 and intermediate the ends thereof. In the form shown, each means 110 comprises a block 112 which is secured to the angles 58 by means of a pair of screws 116, the nuts 118 and 120 serving to secure the blocks in position. Each block 112 is provided with a dowel pin 122 which is adapted to cooperate with means on the holder, such as, for example, a hole, and thereby accurately position the holder on the apparatus.

In operation, the rod 34 is adjusted with respect to the bracket 36 so that, upon the reciprocation of the shaft 40, the plate 20 will be alternately immersed in the coating composition and emersed therefrom, and upon emersion will continue to be elevated to a height whereby the objects 24 to be coated will be immersed in the depression to the predetermined depth. The tank 2 is provided with an aqueous gelatin composition of a concentration which, at about from 50°-65° C., is in a liquid state and at room temperature is a firm jelly. The tank 4 is provided with an appropriate liquid, such as water, and electric energy is supplied to the heaters 6. When the gelatin composition has been liquefied, the shaft 82 is actuated. The cam roller 66 riding on the eccentric 68 imparts reciprocatory movement to the shafts 40 which is, by the means previously described, transmitted to the plate 20, with the result that the plate 20 is alternately submersed and elevated as previously described. During the reciprocation of the plate 20, the racks 102 will cooperate with the gears 100 and cause the agitators 90 to function. When the plate 20 is at its extreme lower position, i. e., completely submerged in the coating medium, the holder 26 carrying the objects 24, which in this embodiment are unit tablets of vitamin preparations previously described, will be positioned on the tank, use being made of the centering and positioning means 110 so that each object 24 will be in alignment with a depression 22. When the plate 20 is emersed from the coating bath, the excess coating medium will flow from the depressions 22 and from the plate through the holes 28. The plate 20 will be emersed and elevated to a height sufficient to simultaneously receive each object 24 in the depression 22 in alignment therewith to a depth wherein the coating medium therein will extend to slightly above the equatorial axis of the tablet 24. After each object is immersed in the depression in alignment therewith, as previously mentioned, continued operation of the apparatus will cause the plate 20 to travel downwardly and again be immersed in the bath of the coating medium. During the downward movement of the plate 20, the operator removes the holder 26, and another holder 26 carrying the tablets 24 is then positioned, and the operation repeated.

Since it is obvious that various changes and modifications may be made in the above description without departing from the nature or spirit thereof, this invention is not restricted thereto except as set forth in the appended claims.

I claim:

1. An apparatus comprising a tank containing a coating composition, means to support a holder carrying a plurality of small objects to be coated stationary and position the said objects above and in spaced relationship to said coating composition, and reciprocating means in said tank to periodically elevate a predetermined quantity of said coating composition and immerse said objects simultaneously therein to a predetermined depth.

2. An apparatus comprising a tank containing a coating composition, means to support a holder carrying a plurality of small objects to be coated stationary and position the said objects above and in spaced relationship to said coating composition, means in said tank to receive and retain a predetermined quantity of said coating composition, and means to periodically elevate the last-named means to simultaneously immerse said objects to a predetermined depth therein.

3. An apparatus comprising a tank containing a coating composition, means to support a holder carrying a plurality of small objects to be coated stationary and position the said objects above and in spaced relationship to said coating composition, means in said tank receiving and retaining a predetermined quantity of the coating composition upon immersion and emersion thereof in said coating composition, and means to reciprocate said means in and out of said coating composition, said reciprocating means elevating the means containing said predetermined quantity of coating composition to simultaneously immerse said objects to a predetermined depth therein.

4. An apparatus comprising a tank containing a coating composition, means to support a holder carrying a plurality of small objects to be coated stationary and position the said objects above and in spaced relationship to said coating composition, a plurality of cups in said tank, each cup being in alignment with one of the articles to be coated, and means to alternately immerse said cups in the coating composition and emerse said cups filled with said coating composition, said means elevating the filled cups sufficiently to immerse simultaneously said objects on said holder to a predetermined depth therein.

5. An apparatus comprising a tank containing a coating composition, means to support a holder carrying a plurality of small objects to be coated stationary and position the said objects above and in spaced relationship to said coating composition, said objects being arranged in a predetermined geometric order on said holder, a plurality of cups in said tank, said cups being arranged in a geometric order corresponding to the arrangement of the objects on said holder whereby each cup is in alignment with one of the articles to be coated, means to fill said cups simultaneously with the coating composition, and means to elevate the filled cups to simultaneously immerse each object in the cup in alignment therewith to a predetermined depth.

6. An apparatus comprising a tank containing a coating composition, means to support a holder carrying a plurality of small objects to be coated stationary and position the said objects above and in spaced relationship to said coating composition, said objects being arranged in a predetermined geometric order on said holder, a plurality of cups in said tank, said cups being arranged in a geometric order corresponding to the arrangement of the objects on said holder whereby each cup is in alignment with one of the articles to be coated, and means to alternately immerse said cups in the coating composition and emerse said cups filled with said coating composition, said means elevating the filled cups to simultaneously immerse each object in the cup in alignment therewith to a predetermined depth.

7. An apparatus comprising a tank containing a coating composition, means to support a holder carrying a plurality of small objects to be coated stationary and position the said objects above and in spaced relationship to said coating composition, said objects being arranged in a predetermined geometric order on said holder, a plate in said tank, said plate being provided with a plurality of depressions arranged in a geometric order corresponding to the arrangement of the objects on said holder whereby each depression is in alignment with one of the articles to be coated, means to fill said depressions with said coating composition, and means to elevate the plate with the filled depressions to simultaneously immerse each object in the depression in alignment therewith to a predetermined depth.

8. An apparatus comprising a tank containing a coating composition, means to support a holder carrying a plurality of small objects to be coated stationary and position the said objects above and in spaced relationship to said coating composition, said objects being arranged in a predetermined geometric order on said holder, a plate in said tank, said plate being provided with a plurality of depressions arranged in a geometric order corresponding to the arrangement of the objects on said holder whereby each depression is in alignment with one of the articles to be coated, and means to alternately immerse said plate in the coating composition and emerse said plate with the depressions filled with said coating composition, said means elevating the plate with the filled depressions to simultaneously immerse each object in the depression in alignment therewith to a predetermined depth.

9. An apparatus comprising a tank containing a coating composition, means to support a holder carrying a plurality of small objects to be coated and position the said objects above and in spaced relationship to said coating composition, said objects being arranged in a predetermined geometric order on said holder, a plate provided with a plurality of depressions arranged in a geometric order corresponding to the arrangement of the objects on said holder, and means to alternately immerse said plate in the coating composition and emerse said plate with the depressions filled with said coating composition, said means elevating the plate with the filled depressions to simultaneously immerse each object in the depression in alignment therewith to a predetermined depth, said plate being provided with means to remove the excess coating composition therefrom.

10. An apparatus comprising a tank containing a coating composition, means to support a holder carrying a plurality of small objects to be coated and position the said objects above and in spaced relationship to said coating composition, said objects being arranged in a predetermined geometric order on said holder, a plate provided with a plurality of depressions arranged in a geometric order corresponding to the arrangement of the objects on said holder, and means to alternately immerse said plate in the coating composition and emerse said plate with the depressions filled with said coating composition, said means elevating the plate with the filled depressions to simultaneously immerse each object in the depression in alignment therewith to a predetermined depth, said plate being provided with a plurality of holes to permit the excess coating composition to drain therefrom.

11. An apparatus comprising a tank containing a coating composition, means to support a holder carrying a plurality of small objects to be coated and position the said objects above and in spaced relationship to said coating composition, said objects being arranged in a predetermined geometric order on said holder, a plate provided with a plurality of depressions arranged in a geometric order corresponding to the arrangement of the objects on said holder, means to alternately immerse said plate in the coating composition and emerse said plate with the depressions filled with said coating composition, said means elevating the plate with the filled depressions to simultaneously immerse each object in the depression in alignment therewith to a predetermined depth, means to agitate said coating composition, and means to actuate said agitating means only during movement of said plate.

12. An apparatus comprising a tank containing a coating composition, means to support a holder carrying a plurality of small objects to be coated and position the said objects above and in spaced relationship to said coating composition, said objects being arranged in a predetermined geometric order on said holder, a plate provided with a plurality of depressions arranged in a geometric order corresponding to the arrangement of the objects on said holder, reciprocating means secured to said plate whereby said plate is alternately immersed in the coating composition and emersed therefrom with the depressions filled with said coating composition, said reciprocating means elevating the plate with the filled depressions to simultaneously immerse each object in the depression in alignment therewith to a predetermined depth therein, means to agitate said composition, and means actuated by said reciprocating means to actuate said agitating means.

13. An apparatus comprising a tank containing a coating composition, means to support a holder carrying a plurality of small objects to be coated and position the said objects above and in spaced relationship to said coating composition, said objects being arranged in a predetermined geometric order on said holder, a plate provided with a plurality of depressions arranged in a geometric order corresponding to the arrangement of the objects on said holder, reciprocating means secured to said plate whereby said plate is alternately immersed in the coating composition and emersed therefrom with the depressions filled with said coating composition, said reciprocating means elevating the plate with the filled depressions to simultaneously immerse each object in the depression in alignment therewith to a predetermined depth therein, a rack secured to said reciprocating means, means mounted on a shaft to agitate said composition, and a gear on said shaft cooperating with said rack.

HARDEN F. TAYLOR.
VLADIMIR A. NEDZVEDSKY.